US012374812B2

(12) United States Patent
Miyamoto

(10) Patent No.: US 12,374,812 B2
(45) Date of Patent: Jul. 29, 2025

(54) TERMINAL BLOCK

(71) Applicant: SUMITOMO WIRING SYSTEMS, LTD., Yokkaichi (JP)

(72) Inventor: Takeru Miyamoto, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 315 days.

(21) Appl. No.: 18/250,753

(22) PCT Filed: Nov. 11, 2021

(86) PCT No.: PCT/JP2021/041513
§ 371 (c)(1),
(2) Date: Apr. 27, 2023

(87) PCT Pub. No.: WO2022/102700
PCT Pub. Date: May 19, 2022

(65) Prior Publication Data

US 2023/0396001 A1 Dec. 7, 2023

(30) Foreign Application Priority Data

Nov. 12, 2020 (JP) ................................ 2020-188954

(51) Int. Cl.
*H01R 9/24* (2006.01)

(52) U.S. Cl.
CPC .................................... *H01R 9/24* (2013.01)

(58) Field of Classification Search
CPC .......... H01R 9/24; H01R 9/18; H01R 9/2425; H01R 9/2458; H01R 9/03; H01R 9/16
USPC .......................................................... 439/709
See application file for complete search history.

(56) References Cited

U.S. PATENT DOCUMENTS

2019/0305446 A1 10/2019 Kawamura et al.
2023/0275369 A1* 8/2023 Hirooka ............. H01R 13/5202 439/709
2025/0047017 A1* 2/2025 Toki ....................... H01R 9/223

FOREIGN PATENT DOCUMENTS

| | | | |
|---|---|---|---|
| JP | 2008067575 | A | 3/2008 |
| JP | 2009110732 | A | 5/2009 |
| JP | 2015095354 | A | 5/2015 |
| WO | 2015045966 | A1 | 4/2015 |

* cited by examiner

*Primary Examiner* — Tulsidas C Patel
*Assistant Examiner* — Jeffrey Mountain

(57) ABSTRACT

A terminal block according to one embodiment is configured to be used with a block body tilted such that a first end part in a second direction is positioned lower than a second end part. The first end part is provided with a plurality of first ribs extending in a first direction. The second end part is provided with a plurality of second ribs extending in the first direction. Furthermore, the number of the first ribs is larger than the number of the second ribs.

10 Claims, 6 Drawing Sheets

TERMINAL BLOCK

BACKGROUND

Field of the Disclosure

The present disclosure relates to a terminal block.

Related Art

Japanese Laid-Open Patent Publication No. 2015-95354 (JP'354) discloses an example of a terminal block for a vehicle. The terminal block includes a block main body and terminals held by the block main body. The block main body includes through holes for accommodating fastened bolts. The block main body includes a first end and a second end. The first end is one end of the block main body in a direction orthogonal to an extension direction of the through holes. The second end is the other end of the block main body located opposite to the first end.

SUMMARY

Such a terminal block may be used in a state positioned such that the block main body is tilted, and the first end is lower than the second end. This increases the load applied to the first end at the lower side of the block main body. Thus, the first end of the block main body may be deformed unless a countermeasure is taken.

It is an objective to improve the strength of a first end in a terminal block that is used in a state in which a block main body is tilted and the first end is lower than a second end.

A terminal block in accordance with the present disclosure includes a block main body and terminals held by the block main body. The block main body includes a through hole, a first end, and a second end. The through hole is for accommodating a fastened bolt. The first end is one end of the block main body in a second direction that is orthogonal to a first direction in which the through hole extends through the block main body. The second end is an end of the block main body located opposite to the first end in the second direction. The terminal block is used in a state in which the block main body is tilted and the first end is lower than the second end. The first end includes first ribs extending in the first direction. The second end includes one or more second ribs extending in the first direction. The number of the first ribs is greater than the number of the second ribs.

Another terminal block in accordance with the present disclosure includes a block main body and terminals held by the block main body. The block main body includes a through hole, a first end, and a second end. The through hole is for accommodating a fastened bolt. The first end is one end of the block main body in a second direction that is orthogonal to a first direction in which the through hole extends through the block main body. The second end is an end of the block main body located opposite to the first end in the second direction. The terminal block is used in a state in which the block main body is tilted and the first end is lower than the second end. The first end includes one or more first ribs extending in the first direction. The second end is free from a rib that extends in the first direction.

The present disclosure improves the strength of the first end in the terminal block that is used in a state in which the block main body is tilted and the first end is lower than the second end.

DETAILED DESCRIPTION

Description of Embodiment of Present Disclosure

Figure 1:
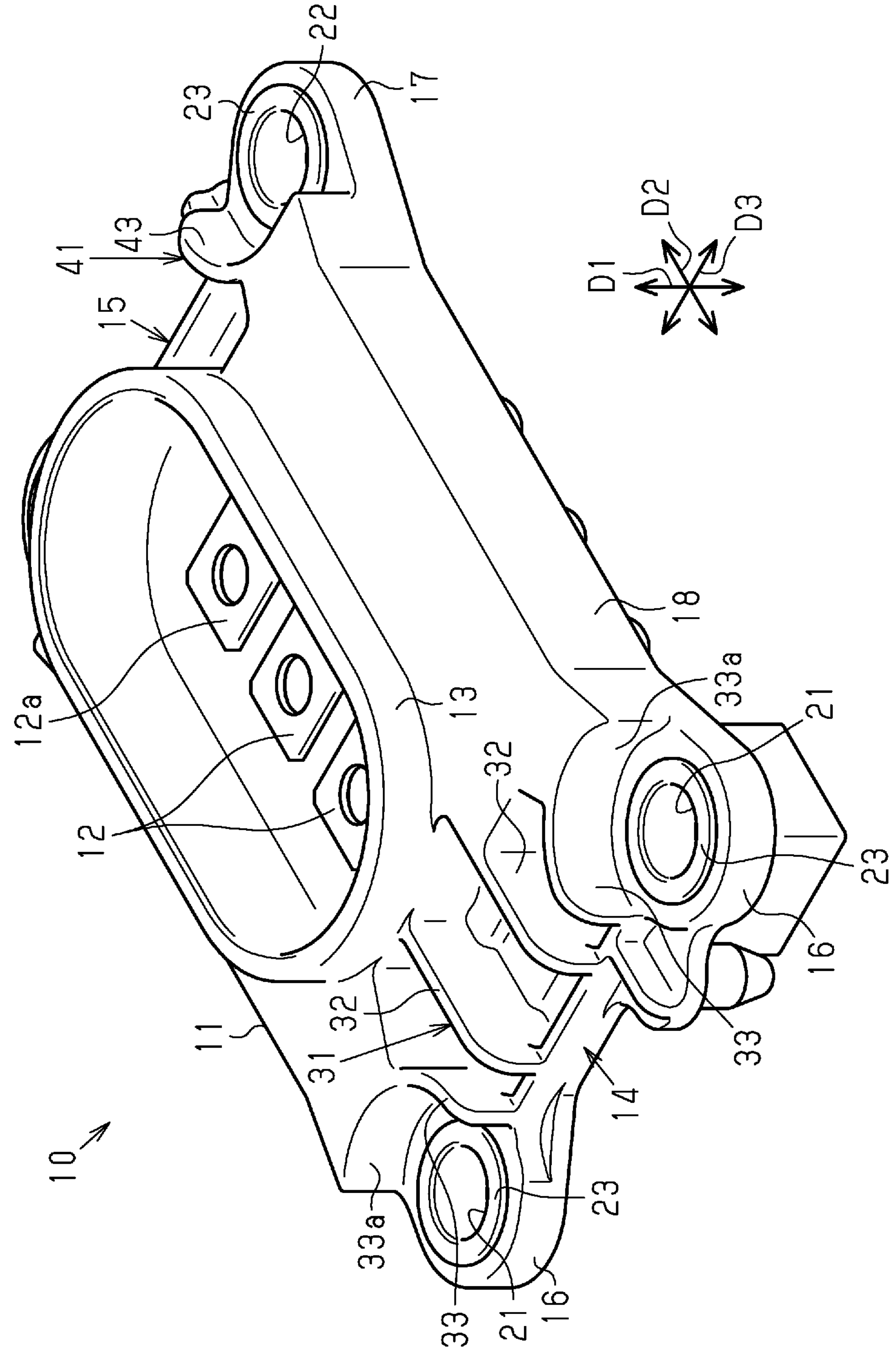
FIG. 1 is a perspective view of a terminal block in accordance with an embodiment.

An embodiment of the present disclosure will now be described.

(1) A terminal block in accordance with the present disclosure includes a block main body and terminals held by the block main body. The block main body includes a through hole, a first end, and a second end. The through hole is for accommodating a fastened bolt. The first end is one end of the block main body in a second direction that is orthogonal to a first direction in which the through hole extends through the block main body. The second end is an end of the block main body located opposite to the first end in the second direction. The terminal block is used in a state in which the block main body is tilted and the first end is lower than the second end. The first end includes first ribs extending in the first direction. The second end includes one or more second ribs extending in the first direction. The number of the first ribs is greater than the number of the second ribs.

With this structure, the first ribs having a greater number of ribs than the second ribs improve the strength of the first end, which is where load is particularly applied because of the tilt of the block main body. This prevents deformation of the first end.

(2) The through hole includes a first through hole and a second through hole. The first through hole extends through the first end in the first direction. The second through hole extends through the second end in the first direction. The first through hole includes two first through holes arranged next to each other in a direction that is orthogonal to the first direction and intersects the second direction. The second through hole includes two second through holes arranged next to each other in a direction that is orthogonal to the first direction and intersects the second direction. The first ribs are arranged between the two first through holes. The second ribs are arranged between the two second through holes. This structure further improves the strength of the first end.

(3) The first ribs include a rib that extends in the second direction as viewed in the first direction.

This structure further improves the strength of the first end. Also, the first rib functions as a guide for draining the water collected on the upper surface of the first end toward the edge of the first end in the second direction.

(4) The first ribs include a third rib that extends along an edge of one of the first through holes as viewed in the first direction. The third rib is shaped such that the third rib extends around a side of the first through hole that is located toward the second end as viewed in the first direction. In the block main body, a side of the first through hole located toward the third rib in the second direction is referred to as an inner side, and a side of the first through hole opposite to the inner side in the second direction is referred to as an outer side. The outer side of the first through hole in the second direction is free from a rib that opposes the third rib in the second direction.

With this structure, the third rib improves the strength of the first end along the first through hole. Also, the third rib protects the first through hole and the fastened bolt in the first through hole from water. The outer side of the first through hole in the second direction is free from a rib that opposes the third rib in the second direction. Thus, the water collected around the first through hole is easily drained out of the first end in the second direction.

(5) The second ribs include a fourth rib that extends along an edge of one of the second through holes as viewed in the first direction. The fourth rib is shaped such that the fourth rib extends around a side of the second through hole that is located toward the first end as viewed in the first direction. A straight line orthogonal to a center axis of the second through hole and parallel to the second direction is referred to as a reference line. The fourth rib includes a side surface located toward the second through hole. The side surface includes a receding surface that extends away from the second through hole as the receding surface becomes farther away from the reference line.

With this structure, the distance from the fastened bolt in the second through hole to the receding surface of the fourth rib becomes greater as the receding surface becomes farther away from the reference line. The receding surface assists drainage of the water entering the gap between the bolt and the fourth rib.

(6) The terminals are arranged next to each other in the second direction.

This structure allows the terminal block of the terminals to be reduced in length in the third direction that is orthogonal to both of the first and second directions.

(7) The first end includes a bottom wall having an upper surface. The first ribs extend from the upper surface of the bottom wall in the first direction. The bottom wall includes a drain portion shaped such that the upper surface becomes closer to a lower surface from a side of the second end toward a side of the first end. With this structure, the drain portion allows the water collected on the upper surface of the first end to be drained toward the edge of the first end in the second direction.

(8) The upper surface of the drain portion is stepped such that the upper surface becomes closer to the lower surface from the side of the second end toward the side of the first end.

This structure allows the block main body to be easily removed from a mold, thereby improving moldability of the block main body.

(9) The lower surface of the bottom wall includes a recess that receives a sealing member. The recess is arranged in the lower surface of the bottom wall so as not to extend across steps of the drain portion.

With this structure, the lower surface of the bottom wall, including the recess, can be shaped in correspondence with the step of the upper surface of the drain portion. Accordingly, the bottom wall has minimal changes in the thickness. This avoids deformation, such as shrinkage, that would be caused by unevenness in the thickness of the bottom wall.

(10) Another terminal block in accordance with the present disclosure includes a block main body and terminals held by the block main body. The block main body includes a through hole, a first end, and a second end. The through hole is for accommodating a fastened bolt. The first end is one end of the block main body in a second direction that is orthogonal to a first direction in which the through hole extends through the block main body. The second end is an end of the block main body located opposite to the first end in the second direction. The terminal block is used in a state in which the block main body is tilted and the first end is lower than the second end. The first end includes one or more first ribs extending in the first direction. The second end is free from a rib that extends in the first direction.

With this structure, the first ribs improve the strength of the first end, which is where load is particularly applied because of the tilt of the block main body. This prevents deformation of the first end.

Detailed Description of Embodiment of Present Disclosure

A specific example of the terminal block in accordance with the present disclosure will now be described with reference to the drawings. To facilitate understanding, configurations may be partially exaggerated or simplified in the drawings. Further, elements in the drawings may not be to scale. In the present specification, "orthogonal" and "perpendicular" include not only strictly orthogonal cases and strictly perpendicular cases but also include generally orthogonal cases and generally perpendicular cases within a range allowing the advantages of the present embodiment to be obtained.

The drawings show three directions orthogonal to one another, namely, a first direction D1, a second direction D2, and a third direction D3. Specifically, the first direction D1 is orthogonal to the second direction D2, the first direction D1 is orthogonal to the third direction D3, and the second direction D2 is orthogonal to the third direction D3.

In the present specification, "the form of a plate" includes a plate-shape of which corners and edges are chamfered or rounded. Also, a recess, a projection, and the like may be formed on part of or all of the plate-shape. The term "cylindrical" as used in this description is not limited to a structure formed by a circumferential wall that extends continuously to be closed in the circumferential direction and also includes cylindrical structures formed by combining multiple parts or a structure that is C-shaped and open in the circumferential direction. Cylindrical shapes include circular, elliptic, and polygonal shapes.

In the present specification, "loop" refers to an entirely seamless structure like a ring, that is, an endless structure having an initiating point and a terminating point that coincide with each other. Further, "loop" in this specification includes endless shapes of which the outer edge has the form of a circle, ellipse, oval, polygon, or polygon with rounded corners, as well as any closed shape having the outer edge formed by a straight line or a curved line. The term "loop" includes a shape that includes an outer edge and an inner edge shaped identically or differently. The term "loop" includes a shape that has a predetermined length along its central axis, and the length may be large or small. Furthermore, "closed shape" in the present specification may only be regarded as a loop as a whole and includes shapes having a gap, a slit, or the like as in a C-shape.

Terminal Block 10

Figure 2:
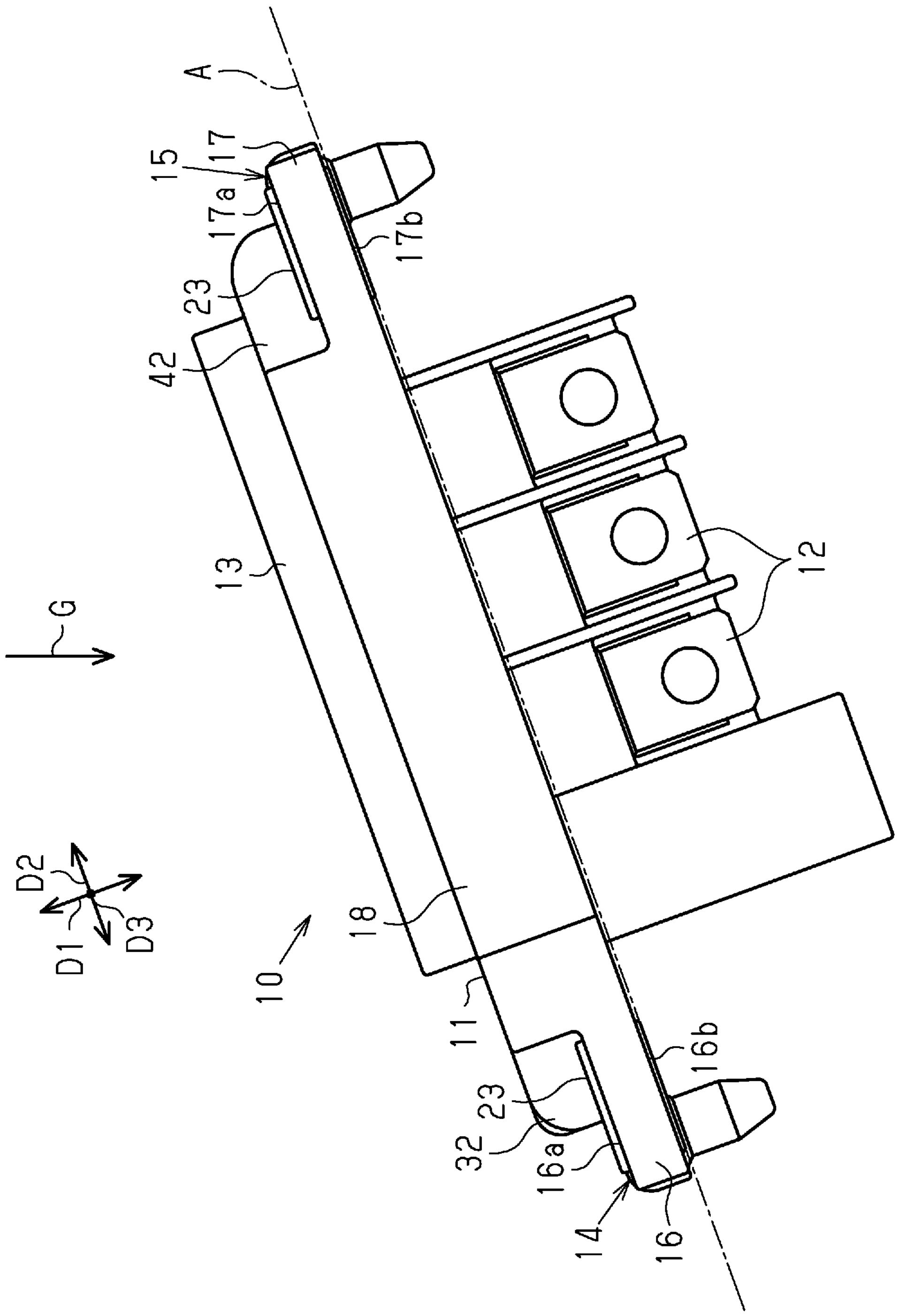
FIG. 2 is a side view of the terminal block in accordance with the same embodiment in a state mounted on a vehicle.

A terminal block 10 of the present embodiment shown in FIGS. 1 and 2 is coupled to a coupling surface A of a device installed in a vehicle. As shown in FIG. 2, the coupling surface A is inclined with respect to the gravitational direction G. Thus, the terminal block 10 is tilted with respect to the gravitational direction G in a state coupled to the coupling surface A. In the coupled state, the terminal block 10 is tilted by, for example, approximately twenty degrees. The device is, for example, a driving motor for a battery electric vehicle, a hybrid electric vehicle, or the like.

As shown in FIG. 1, the terminal block 10 includes a block main body 11 and terminals 12 held by the block main body 11. The block main body 11 is mainly formed from, for example, synthetic resin. Further, the block main body 11 is formed through, for example, injection molding.

Figure 3:
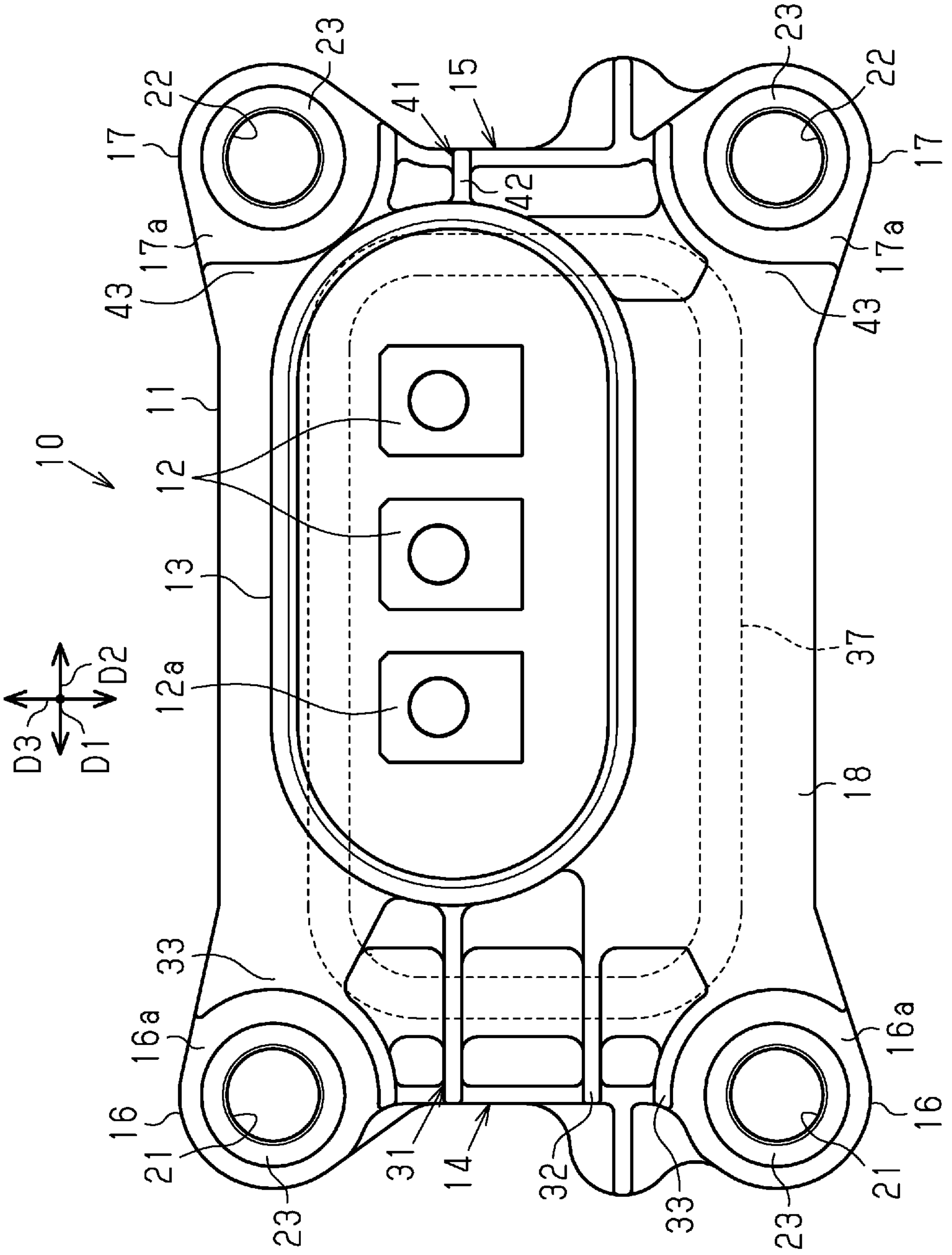
FIG. 3 is a plan view of the terminal block in accordance with the same embodiment.

FIG. 3 shows the terminal block 10 as viewed in the first direction D1. As shown in FIG. 3, the block main body 11 is longer in the second direction D2 than the third direction D3 as viewed in the first direction D1. The block main body 11 is, for example, substantially rectangular as viewed in the first direction D1.

The terminal block 10 includes, for example, multiple terminals 12. The terminals 12 are, for example, arranged next to each other in the second direction D2. Each terminal 12 includes one end 12*a* in the first direction D1 that is connected to a corresponding terminal of an associated connector (not shown). The terminal of the connector is connected to the terminal 12 in the first direction D1. The other end of the terminal 12 in the first direction D1 is connected to a corresponding terminal of the above-mentioned device.

The one ends 12*a* of the terminals 12 in the first direction D1 are surrounded by a circumferential wall 13 arranged on the block main body 11. The circumferential wall 13 extends in the first direction D1. Further, the circumferential wall 13 has a closed shape as viewed in the first direction D1. The terminals 12 are arranged inside the looped circumferential wall 13. The circumferential wall 13 is fitted to a holder of the terminals of the associated connector.

Block Main Body 11

As shown in FIGS. 1 and 3, the block main body 11 includes a first end 14 and a second end 15. The first end 14 is one end of the block main body 11 in the second direction D2. The second end 15 is an end of the block main body 11 opposite to the first end 14 in the second direction D2. The circumferential wall 13 is arranged between the first end 14 and the second end 15. As shown in FIG. 2, the block main body 11 is coupled to the coupling surface A in a tilted state in which the first end 14 is lower than the second end 15.

As shown in FIGS. 2 and 3, the block main body 11 includes first fastening portions 16 fastened to the coupling surface A. Further, the block main body 11 includes second fastening portions 17 fastened to the coupling surface A. The first fastening portions 16 are, for example, respectively arranged on two ends of the first end 14 in the third direction D3. The second fastening portions 17 are, for example, respectively arranged on two ends of the second end 15 in the third direction D3. In other words, in the block main body 11 of the present embodiment, four fastening portions, namely, two first fastening portions 16 and two second fastening portions 17, are respectively arranged on four corners of the block main body 11 as viewed in the first direction D1. The first fastening portions 16 and the second fastening portions 17 are each fastened to the coupling surface A by, for example, a bolt or the like. The first fastening portions 16 and the second fastening portions 17 are, for example, formed to be thinner than a main part 18 of the block main body 11 in the first direction D1. The main part 18 of the block main body 11 is a portion of the block main body 11 between the first end 14 and the second end 15. The circumferential wall 13 is arranged on the main part 18.

The block main body 11 includes first through holes 21 and second through holes 22 for accommodating fastened bolts. The block main body 11 includes, for example, two first through holes 21. The first through holes 21 are arranged in the two first fastening portions 16, respectively. Further, the block main body 11 includes, for example, two second through holes 22. The second through holes 22 are arranged in the two second fastening portions 17, respectively. A fastening bolt (not shown) is inserted through each of the first and second through holes 21 and 22.

Figure 4:
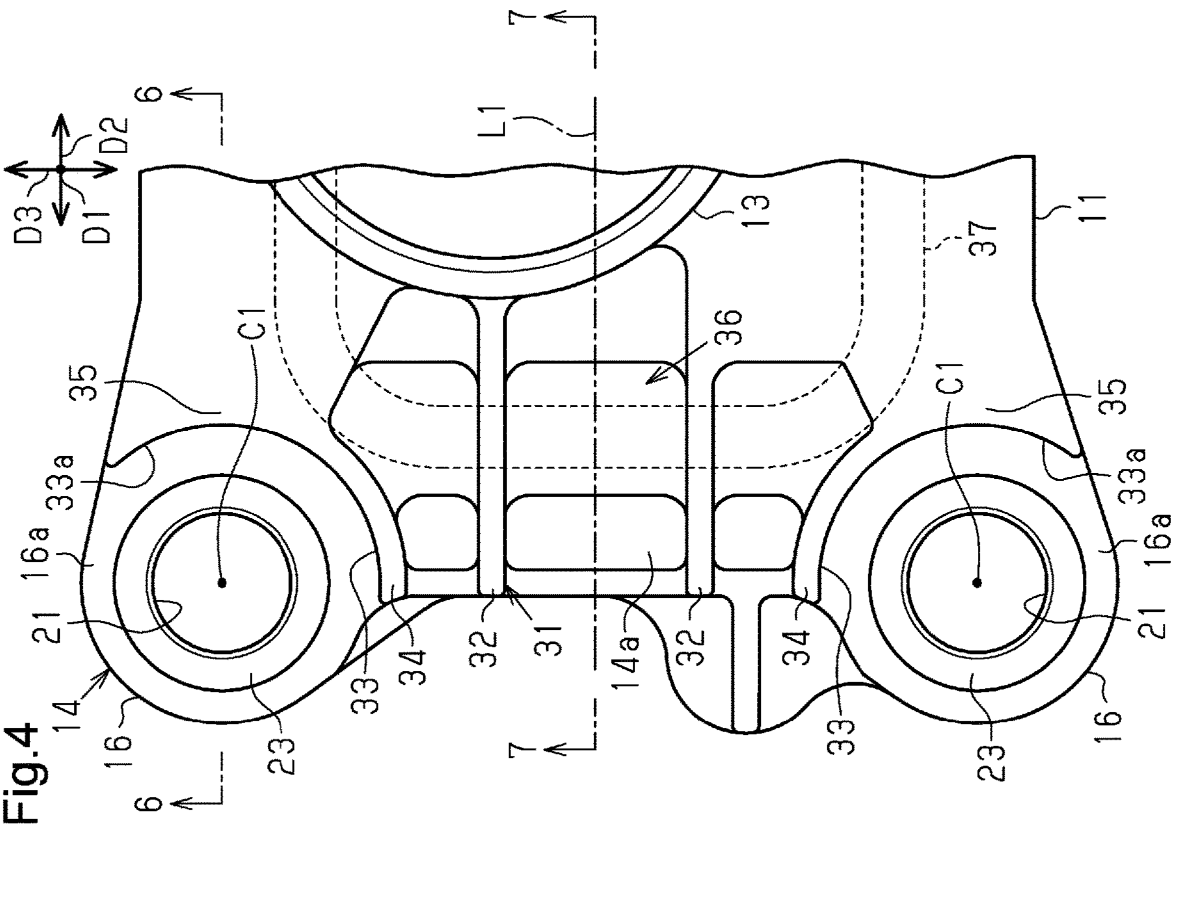
FIG. 4 is an enlarged plan view showing a first end of the terminal block in accordance with the same embodiment.

As shown in FIG. 4, the first through holes 21 extend through corresponding first fastening portions 16 in the first direction D1. Each first through hole 21 is, for example, circular as viewed in the first direction D1. One of the first through holes 21 is arranged in one end of the first end 14 in the third direction D3. The other one of the first through holes 21 is arranged in the other end of the first end 14 in the third direction D3. In other words, one of the first through holes 21 is arranged at one side of the block main body 11 in the third direction D3 with respect to a centerline L1, and the other one of the first through holes 21 is arranged at the other side of the block main body 11 with respect to the centerline L1.

In the description hereafter, the side of the first through hole 21 located toward the centerline L1 in the third direction D3 will be referred to as "the inner side of the first through hole 21 in the third direction D3", and the side opposite to the inner side will be referred to as "the outer side of the first through hole 21 in the third direction D3". Further, in the description hereafter, the side of the first through hole 21 located toward the second end 15 in the second direction D2 will be referred to as "the inner side of the first through hole 21 in the second direction D2", and the side opposite to the inner side will be referred to as "the outer side of the first through hole 21 in the second direction D2".

The two first through holes 21 are arranged next to each other in the third direction D3. Specifically, the two first through holes 21 are arranged next to each other in a direction that is orthogonal to the first direction D1 and intersects the second direction D2.

Figure 5:
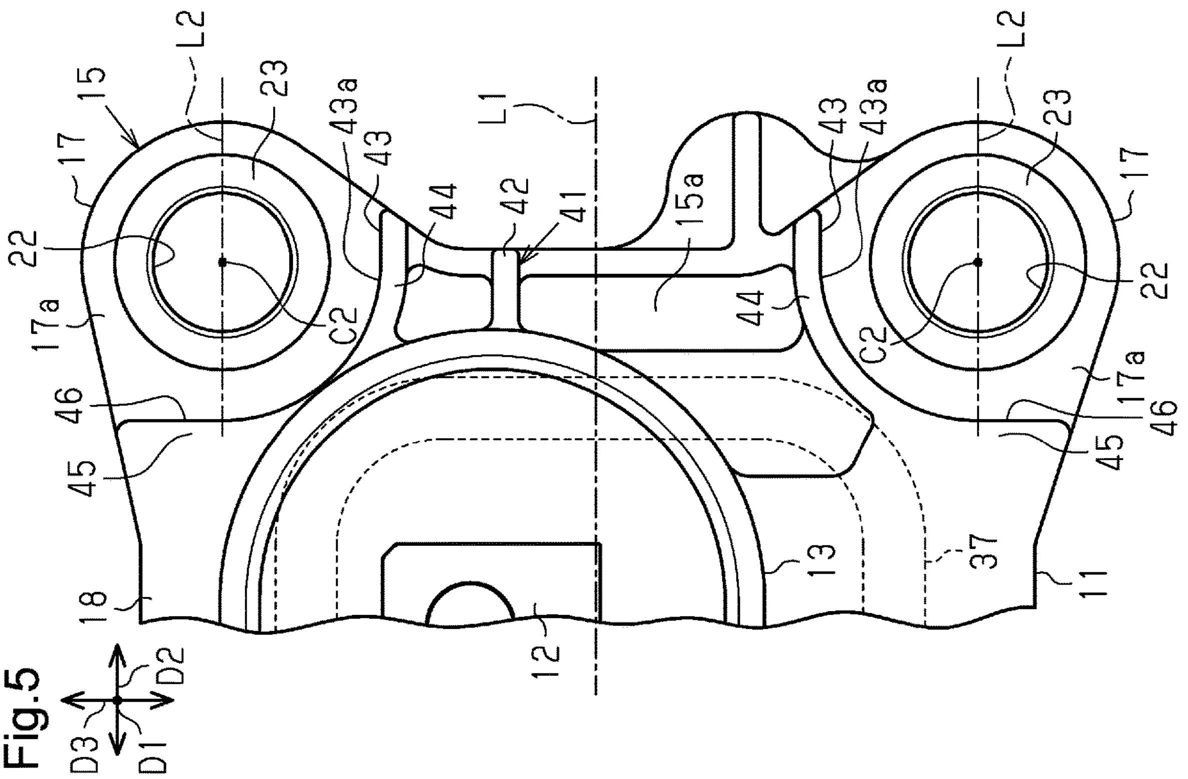
FIG. 5 is an enlarged plan view showing a second end of the terminal block in accordance with the same embodiment.

As shown in FIG. 5, the second through holes 22 extend through corresponding second fastening portions 17 in the first direction D1. Each second through hole 22 is, for example, circular as viewed in the first direction D1. One of the second through holes 22 is arranged in one end of the second end 15 in the third direction D3. The other one of the second through holes 22 is arranged in the other end of the second end 15 in the third direction D3. In other words, one of the second through holes 22 is arranged at one side of the block main body 11 in the third direction D3 with respect to the centerline L1, and the other one of the second through holes 22 is arranged at the other side of the block main body 11 with respect to the centerline L1.

In the description hereafter, the side of the second through hole 22 located toward the centerline L1 in the third direction D3 will be referred to as "the inner side of the second through hole 22 in the third direction D3", and the side opposite to the inner side will be referred to as "the outer side of the second through hole 22 in the third direction D3". Further, in the description hereafter, the side of the second through hole 22 located toward the first end 14 in the second direction D2 will be referred to as "the inner side of the second through hole 22 in the second direction D2", and the side opposite to the inner side will be referred to as "the outer side of the second through hole 22 in the second direction D2".

The second through holes 22 are arranged next to each other in the third direction D3. Specifically, the two second through holes 22 are arranged next to each other in a direction that is orthogonal to the first direction D1 and intersects the second direction D2.

The first and second through holes 21 and 22 are each defined by, for example, a cylindrical collar 23. In other words, each of the first and second through holes 21 and 22 is the hollow portion of a corresponding cylindrical collar 23. The collar 23 is formed from a material, such as metal, having a higher rigidity than the synthetic resin forming the main portion of the block main body 11. Each collar 23 is, for example, partially embedded in the resin part of the corresponding one of the first and second fastening portions 16 and 17.

First Rib 31

As shown in FIG. 4, the first end 14 of the block main body 11 includes first ribs 31 extending in the first direction D1. The first ribs 31 include ribs 32 and ribs 33.

The ribs 32 extend from an upper surface of a bottom wall 14*a* of the first end 14 in the first direction D1. The bottom wall 14*a* is a part of the first end 14 that connects the two first fastening portions 16. The side of the bottom wall 14*a* at which the ribs 32 are arranged will be referred to as the upper side, and the side opposite to the upper side will be referred to as the lower side.

Each rib 32 extends in the second direction D2 as viewed in the first direction D1. The rib 32 has, for example, the form of a plate perpendicular to the third direction D3. For example, there are two ribs 32. The two ribs 32 are arranged next to each other in the third direction D3. The ribs 32 are disposed between the two first through holes 21 in the third direction D3. One of the two ribs 32 is positioned to correspond with, for example, the center position of the circumferential wall 13 in the third direction D3, and one end of this rib 32 in the second direction D2 is connected to an outer surface of the circumferential wall 13.

The first end 14 includes, for example, two ribs 33. Each rib 33 extends around a corresponding first through hole 21.

Figure 6:
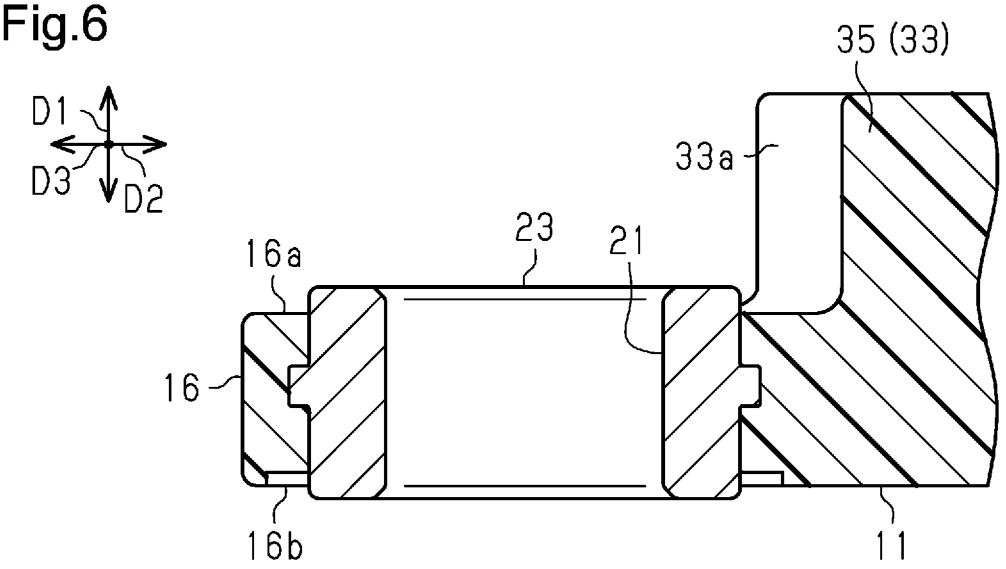
FIG. 6 is a cross-sectional view taken along line 6-6 shown in FIG. 4.

As shown in FIGS. 2 and 6, the resin part of each first fastening portion 16 includes an upper surface 16*a* and a lower surface 16*b*. The upper surface 16*a* is, for example, a flat surface and perpendicular to the first direction D1. The upper end, which is an axial end, of the collar 23 projects out of the upper surface 16*a* in the first direction D1. The lower surface 16*b* of the first fastening portion 16 faces the coupling surface A. A bolt (not shown) is fastened to the first fastening portion 16 from the side of the upper surface 16*a*. The ribs 33 extend from the upper surface 16*a* of the first fastening portion 16 in the first direction D1.

As shown in FIG. 4, each rib 33 is shaped such that the rib 33 partially extends around the corresponding first through hole 21 in a circumferential direction as viewed in the first direction D1. Further, the rib 33 extends along the edge of the first through hole 21 as viewed in the first direction D1. Specifically, the rib 33 includes a side surface 33*a* located toward the first through hole 21. The side surface 33*a* is entirely arc-shaped in the circumferential direction about a center axis C1 of the first through hole 21.

Each rib 33 includes a first portion 34 and a second portion 35. The first portion 34 is located at the inner side of the corresponding first through hole 21 in the third direction D3. That is, the first portions 34 are located between the two first through holes 21. The two ribs 32 are located between the first portions 34 of the two ribs 33 in the third direction D3.

The second portion 35 is located at the inner side of the each first through hole 21 in the second direction D2. The second portion 35 is shaped such that the second portion 35 extends around the inner side of the first through hole 21 in the second direction D2 as viewed in the first direction D1. In both of the first portion 34 and the second portion 35, the side surface 33*a* of the rib 33 is arc-shaped and centered about the center axis C1.

As shown in FIGS. 4 and 6, at the side of the upper surface 16*a* of the first fastening portion 16, the outer side of each first through hole 21 in the second D2 is open. In other words, the outer side of the first through hole 21 in the second direction D2 is free from a rib that opposes the second portion 35 of the rib 33 in the second direction D2.

As described above, the first ribs 31 are disposed between the two first through holes 21. In the present embodiment, the total number of the first ribs 31 arranged on the first end 14 is four; that is, two ribs 32 and two ribs 33.

Figure 7:
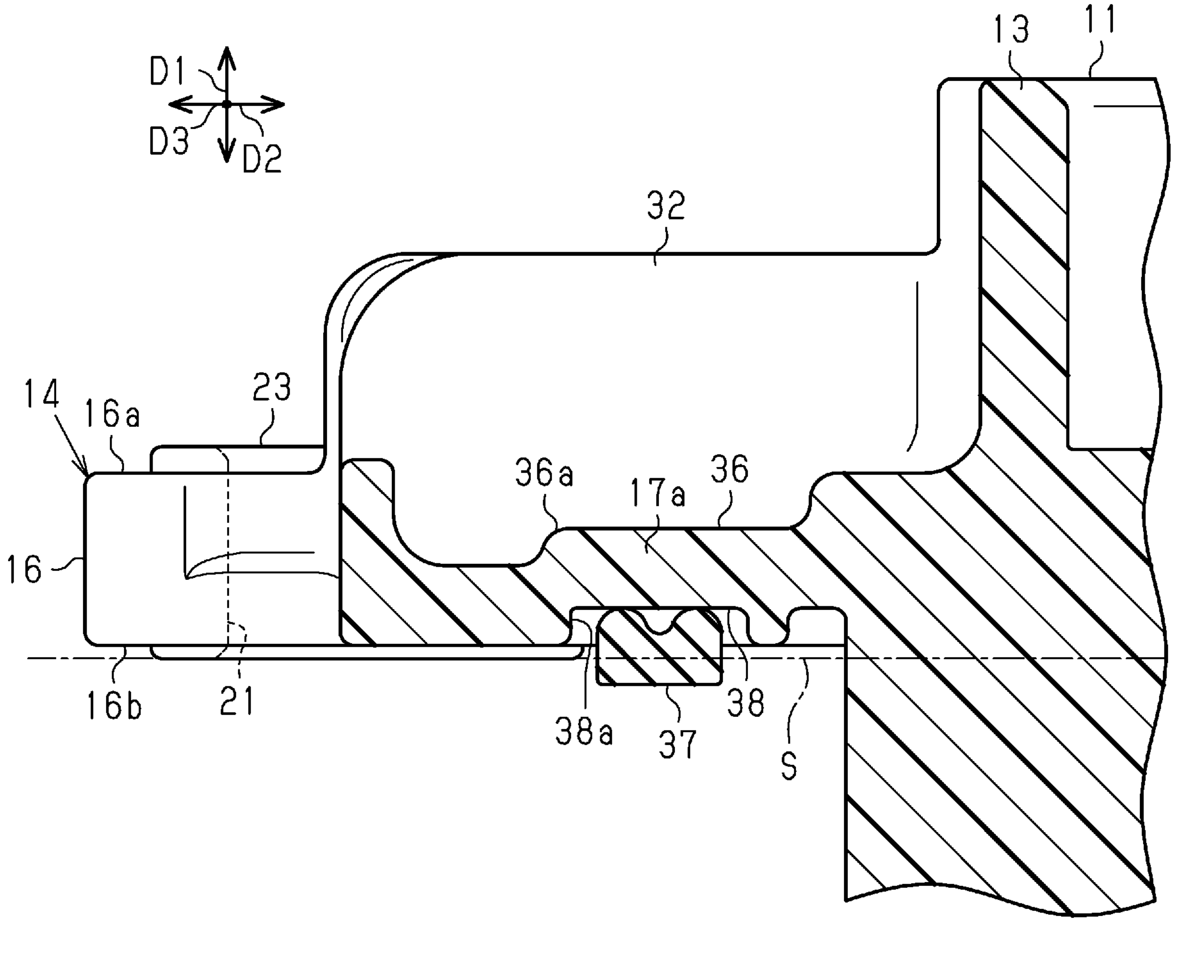
FIG. 7 is a cross-sectional view taken along line 7-7 shown in FIG. 4.

As shown in FIGS. 4 and 7, the bottom wall 14*a* includes a drain portion 36 in the first end 14 of the block main body 11. The drain portion 36 is, for example, arranged between the two ribs 32. Further, the drain portion 36 is arranged, for example, between each rib 32 and the first portion 34 of a corresponding rib 33. The drain portion 36 has a structure in which the upper surface of the bottom wall 14*a* becomes closer to the lower surface in the second direction D2 from the side of the second end 15 toward the side of the first end 14. Hereinafter, the upper surface of the bottom wall 14*a* in the drain portion 36 will be referred to as the upper surface of the drain portion 36.

As shown in FIG. 7, the upper surface of the drain portion 36 is, for example, stepped such that the upper surface becomes closer to the lower surface from the side of the second end 15 toward the side of the first end 14. A plane orthogonal to the first direction D1 and lying along the lower end of the first through hole 21 is located will be referred to as a reference surface S. The distance from the upper surface of the drain portion 36 to the reference surface S in the first direction D1 becomes smaller for each descending step of the drain portion 36 from the side of the second end 15 toward the side of the first end 14.

The lower surface of the bottom wall 14*a* includes a recess 38 that receives a sealing member 37. The lower surface of the block main body 11 includes a groove (not shown) that has a closed shape as viewed in the first direction D1, and the recess 38 is part of the looped recess in the circumferential direction. The looped recess receives the ring-shaped sealing member 37 shown in FIG. 3. In a state in which the terminal block 10 is coupled to the coupling surface A, the sealing member 37 is compressed between the lower surface of the block main body 11 and the coupling surface A. In this manner, the sealing member 37 seals the gap between the terminal block 10 and the coupling surface A.

As shown in FIG. 7, the recess 38 has the form of a groove that extends in the third direction D3 in the lower surface of the bottom wall 14*a*. Further, the recess 38 is arranged at a position corresponding to one of the steps of the drain portion 36. Specifically, the recess 38 is arranged in the lower surface of the bottom wall 14*a* so as not to extend across steps of the drain portion 36. In the present embodiment, the drain portion 36 includes three steps, namely, an upper step, a middle step, and a lower step. The recess 38 is arranged in correspondence with the middle step of the drain portion 36. Further, an edge 38*a* of the recess 38 in the second direction D2 substantially coincides with a boundary 36*a* of the step of the drain portion 36 in the first direction D1.

Second Rib 41

As shown in FIG. 5, the second end 15 of the block main body 11 includes second ribs 41 extending in the first direction D1. The second ribs 41 include a rib 42 and ribs 43.

The rib 42 extends from a bottom wall 15*a* of the second end 15 in the first direction D1. The bottom wall 15*a* is a part of the second end 15 that connects the two second fastening portions 17. The side of the bottom wall 15*a* at which the rib 42 is arranged will be referred to as the upper side, and the side opposite to the upper side will be referred to as the lower side.

The rib 42 extends in the second direction D2 as viewed in the first direction D1. The rib 42 has, for example, the form of a plate perpendicular to the third direction D3. For example, there is one rib 42. The rib 42 is disposed between the two second through holes 22 in the third direction D3. The rib 42 is positioned to correspond with, for example, the center position of the circumferential wall 13 in the third direction D3. Further, one end of the rib 42 in the second direction D2 is connected to the outer surface of the circumferential wall 13.

The second end 15 includes, for example, two ribs 43. Each rib 43 extends around a corresponding second through hole 22.

As shown in FIG. 2, the resin part of each second fastening portion 17 includes an upper surface 17*a* and a lower surface 17*b*. The upper surface 17*a* is, for example, a flat surface and perpendicular to the first direction D1. The upper end, which is an axial end, of the collar 23 projects out of the upper surface 17*a* in the first direction D1. The lower surface 17*b* of the second fastening portion 17 faces the coupling surface A. A bolt (not shown) is fastened to the second fastening portion 17 from the side of the upper surface 17*a*. The ribs 43 extend from the upper surface 17*a* of the second fastening portion 17 in the first direction D1.

As shown in FIG. 5, each rib 43 is shaped such that the rib 43 extends around part of the corresponding second through hole 22 in a circumferential direction as viewed in the first direction D1. Further, the rib 43 extends along the edge of the second through hole 22 as viewed in the first direction D1. Specifically, the rib 43 includes a side surface 43*a* located toward the second through hole 22. The side surface 43*a* is entirely arc-shaped in the circumferential direction about a center axis C2 of the second through hole 22.

Each rib 43 includes a first portion 44 and a second portion 45. The first portion 44 is located at the inner side of the corresponding second through hole 22 in the third direction D3. That is, the first portions 44 are located between the two second through holes 22. In the first portion 44, the side surface 43*a* of the rib 43 is arc-shaped and centered about the center axis C2. The rib 42 is located between the first portions 44 of the two ribs 43 in the third direction D3.

The second portion 45 of each rib 43 is located at the inner side of the corresponding second through hole 22 in the second direction D2. The second portion 45 is shaped such that the second portion 45 extends around the inner side of the second through hole 22 in the second direction D2 as viewed in the first direction D1.

The side surface of the second portion 45 located toward each second through hole 22 defines a receding surface 46. The receding surface 46 is, for example, a flat surface and perpendicular to the second direction D2. That is, the receding surface 46 extends in the third direction D3 as viewed in the first direction D1. The second portion 45 and the receding surface 46 extend, for example, to the edge of the corresponding second fastening portion 17 in the third direction D3. A straight line orthogonal to the center axis C2 of the second through hole 22 and parallel to the second direction D2 will be referred to as the reference line L2. At the outer side of each second through hole 22 in the third direction D3, the receding surface 46 extends away from the corresponding second through hole 22 as the receding surface becomes farther away from the reference line L2 in the third direction D3. In other words, the distance from each second through hole 22 to the corresponding second portion 45 becomes greater toward the outer side of the second through hole 22 in the third direction D3.

At the side of the upper surface 17*a* of the second fastening portion 17, the outer side of each second through hole 22 in the second direction D2 is open. In other words, the outer side of the second through hole 22 in the second direction D2 is free from a rib that opposes the second portion 45 of the rib 43 in the second direction D2.

As described above, the second ribs 41 are disposed between the two second through holes 22. In the present embodiment, the total number of the second ribs 41 arranged on the second end 15 is three; that is, one rib 42 and two ribs 43. Thus, the block main body 11 includes a greater number of the first ribs 31 than the second ribs 41.

The present embodiment has the following advantages.

(1) In the block main body 11, the number of first ribs 31 arranged on the first end 14, which is located at the lower side with respect to the inclination, is greater than the number of second ribs 41 arranged on the second end 15, which is located at the upper side with respect to the inclination. With this structure, the first ribs 31 having a greater number of ribs than the second ribs 41 improve the strength of the first end 14, which is where load is particularly applied because of the tilt of the block main body 11. This prevents deformation of the first end 14.

(2) The through holes of the block main body 11 include the first through hole 21 extending through the first end 14 in the first direction D1, and the second through hole 22 extending through the second end 15 in the first direction D1. Two first through holes 21 are arranged next to each other in a direction that is orthogonal to the first direction D1 and intersects the second direction D2. Two second through holes 22 are arranged next to each other in a direction that is orthogonal to the first direction D1 and intersects the second direction D2. The first ribs 31 are arranged between the two first through holes 21, and the second ribs 41 are arranged between the two second through holes 22. This structure further improves the strength of the first end 14.

(3) The first ribs 31 include the rib 32 that extends in the second direction D2 as viewed in the first direction D1. This structure further improves the strength of the first end 14. Also, the rib 32 functions as a guide for draining the water collected on the upper surface of the first end 14 toward the edge of the first end 14 in the second direction D2.

(4) The first ribs 31 include the rib 33 that extends along the edge of the corresponding first through hole 21 as viewed in the first direction D1. The second portion 35 of the rib 33 is shaped such that the second portion 35 extends around the side of the first through hole 21 that is located toward the second end 15 as viewed in the first direction D1. In the block main body 11, the side of the first through hole 21 located toward the second portion 35 in the second direction D2 is referred to as the inner side, and the side opposite to the inner side is referred to as the outer side of the first through hole 21 in the second direction D2. The outer side of the first through hole 21 in the second direction D2 is free from a rib that opposes the second portion 35 in the second direction D2. With this structure, the rib 33 improves the strength of the first end 14 along the first through hole 21. Also, the rib 33 protects the first through hole 21 and the fastened bolt in the first through hole 21 from water. The outer side of the first through hole 21 in the second direction D2 is free from a rib that opposes the second portion 35 of the rib 33 in the second direction D2. Thus, the water collected around the first through hole 21 is easily drained out of the first end 14 in the second direction D2.

(5) The second ribs 41 include the rib 43 that extends along the edge of the second through hole 22 as viewed in the first direction D1. The second portion 45 of the rib 43 is shaped such that the second portion 45 extends around the side of the second through hole 22 that is located toward the first end 14 as viewed in the first direction D1. The straight line orthogonal to the center axis C2 of the second through hole 22 and parallel to the second direction D2 is referred to as the reference line L2. The side surface 43*a* of the rib 43 located toward the second through hole 22 includes the receding surface 46 that extends away from the second through hole 22 as the receding surface 46 becomes farther away from the reference line L2. With this structure, the distance from the fastened bolt in the second through hole 22 to the receding surface 46 of the rib 43 becomes greater as the receding surface 46 becomes farther away from the reference line L2. Thus, the receding surface 46 assists drainage of the water entering the gap between the bolt and the rib 43.

(6) Multiple terminals 12 are arranged next to each other in the second direction D2. This structure allows the terminal block 10 of the terminals 12 to be reduced in length in the third direction D3.

(7) The first end 14 includes the bottom wall 14*a* having the upper surface. The first ribs 31 extend from the upper surface of the bottom wall 14*a* in the first direction D1. The bottom wall 14*a* includes the drain portion 36 shaped such that the upper surface becomes closer to the lower surface from the side of the second end 15 toward the side of the first end 14. With this structure, the drain portion 36 allows the water collected on the upper surface of the first end 14 to be drained toward the edge of the first end 14 in the second direction D2.

(8) The upper surface of the drain portion 36 is stepped such that the upper surface becomes closer to the lower surface from the side of the second end 15 toward the side of the first end 14. This structure allows the block main body 11 to be easily removed from a mold, thereby improving moldability of the block main body 11.

(9) The lower surface of the bottom wall 14*a* includes the recess 38 that receives the sealing member 37. The recess 38 is arranged in the lower surface of the bottom wall 14*a* so as not to extend across the steps of the drain portion 36. With this structure, the lower surface of the bottom wall 14*a*, including the recess 38, can be shaped in correspondence with the steps of the upper surface of the drain portion 36. Accordingly, the bottom wall 14*a* has minimal changes in the thickness. This avoids deformation, such as shrinkage, that would be caused by unevenness in the thickness of the bottom wall 14*a*.

The present embodiment may be modified as follows. The present embodiment and the following modifications can be combined as long as the combined modifications remain technically consistent with each other.

In the lower surface of the bottom wall 14*a*, the recess 38 may be arranged to extend across the steps of the drain portion 36. Alternatively, the lower surface of the bottom wall 14*a* does not have to include the recess 38. In this case, the lower surface of the drain portion 36 may be entirely flat and perpendicular to the first direction D1.

The upper surface of the drain portion 36 may only be shaped such that the upper surface becomes closer to the lower surface from the side of the second end 15 toward the side of the first end 14. In the above embodiment, the upper surface of the drain portion 36 is stepped such that the upper surface becomes closer to the lower surface from the side of the second end 15 toward the side of the first end 14. However, instead of the steps, the upper surface of the drain portion 36 may be a sloped surface inclined toward the lower surface from the side of the second end 15 located toward the side of the first end 14.

The drain portion 36 may be omitted from the bottom wall 14*a*, and the upper surface of the bottom wall 14*a* may be evenly flat and perpendicular to the first direction D1.

The terminals 12 do not have to be arranged as described in the above embodiment. For example, the terminals 12 may be arranged next to each other in the third direction D3.

In the present disclosure, the side surface 43*a* of the rib 43 includes the receding surface 46 that extends away from the second through hole 22 as the receding surface 46 becomes farther away from the reference line L2. However, there is no limit to such a structure. The side surface 43*a* may be entirely arc-shaped and centered about the center axis C2 of the second through hole 22.

The number of first ribs 31 arranged on the first end 14 and the number of second ribs 41 arranged on the second end 15 do not have to be the same as the above embodiment. The numbers may be changed in accordance with the structure of the block main body 11 or like as long as the number of first ribs 31 is greater than that of second ribs 41.

Figure 8:
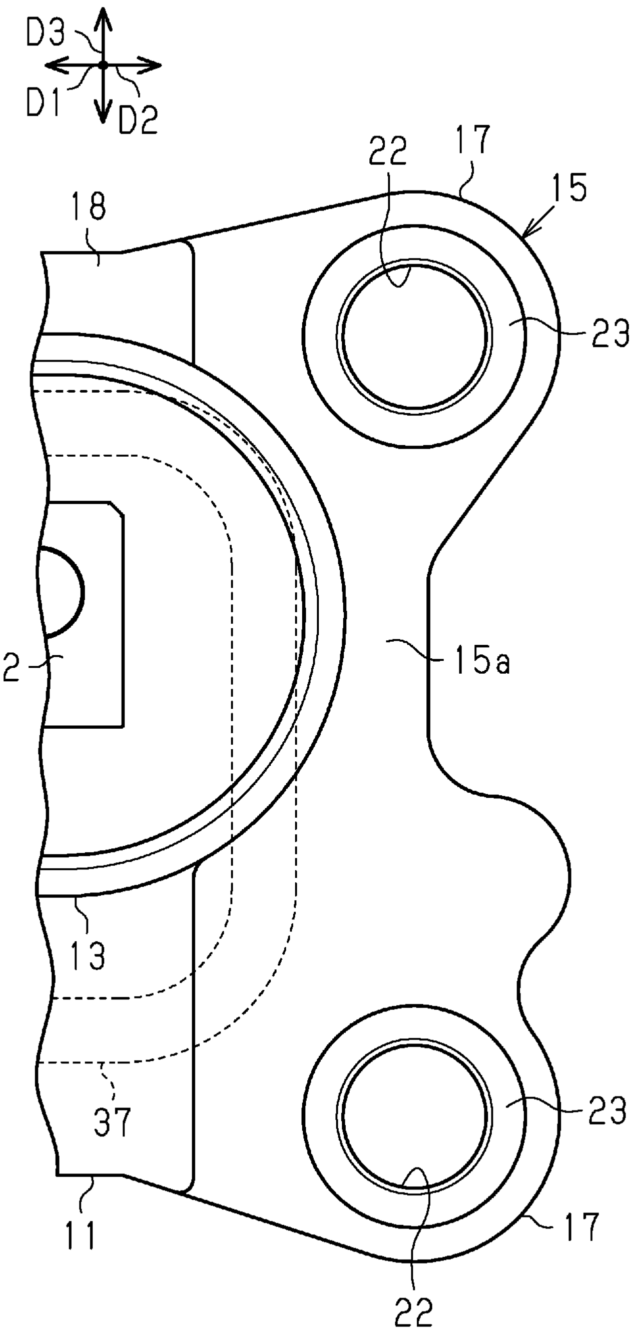
FIG. 8 is an enlarged plan view showing a second end of a terminal block in a modified example.

As shown in FIG. 8, the number of ribs arranged on the second end 15 may be zero, that is, the second end 15 may be free from a rib that extends in the first direction D1. In this case, the number of first ribs arranged on the first end 14 may be one. Even with this structure, the first rib 31 improves the strength of the first end 14, which is where load is particularly applied because of the tilt of the block main body 11. This prevents deformation of the first end 14.

The number of first through holes 21 arranged in the first end 14 and the number of second through holes 22 arranged in the second end 15 do not have to be the same as the above embodiment. The numbers may be changed in accordance with the structure of the block main body 11. For example, the number of first through holes 21 arranged in the first end 14 may be one or three or greater. The first through holes 21 do not have to be arranged next to each other in the third direction D3. Further, the second through holes 22 do not have to be arranged next to each other in the third direction D3.

In the block main body 11 of the above embodiment, the second direction D2 that defines the first end 14 and the second end 15 coincides with the longitudinal direction of the block main body 11. However, there is no limit to such a structure. For example, the second direction D2 defining the first end 14 and the second end 15 may coincide with the latitudinal direction of the block main body 11.

In the above embodiment, the block main body 11 is longer in the second direction D2 than the third direction D3 as viewed in the first direction D1. However, there is no limit to such a structure. For example, the block main body 11 may be longer in the third direction D3 than the second direction D2. Alternatively, the block main body 11 may be substantially the same in length in the second direction D2 and the third direction D3.

The inclination angle of the block main body 11 in a state fastened to the coupling surface A is not limited to that described in the above embodiment. The inclination angle may be changed in accordance with the structure of the associated device and the like.

As shown in FIGS. 1 to 4 and 6, the outermost surface of each first fastening portion 16 may be part of the outermost surface of the block main body 11. The upper surface 16*a* of each first fastening portion 16 may be continuous with the outermost surface of the block main body 11 without, for example, a step. For example, between the upper surface 16*a* of the first fastening portion 16 and the outermost surface of the block main body 11, the block main body 11 does not have to include a recess, such as a groove, and/or a projection, such as a wall. The upper surface 16*a* of the first fastening portion 16 may be continuous with the outermost surface of the corresponding collar 23 without, for example, a step. For example, between the upper surface 16*a* of the first fastening portion 16 and the outermost surface of the collar 23, the block main body 11 does not have to include a recess, such as a groove, and/or a projection, such as a wall. The block main body 11 does not have a recess or a projection that would interfere with flow of water on the upper surface 16*a* of the first fastening portion 16 (between outermost surface of collar 23 and the outermost surface of block main body 11). This block main body 11 is advantageous in that the water collected on the upper surface 16*a* of the first fastening portion 16 readily flows out toward the outermost surface of the block main body 11 due to the gravitational force and/or the surface tension. For example, even when the block main body 11 is level, the water on the upper surface 16*a* of the first fastening portion 16 may flow out toward the outermost surface of the block main body 11 due to the surface tension.

As shown in FIGS. 2, 3, and 5, the outermost surface of each second fastening portion 17 may be part of the outermost surface of the block main body 11. The upper surface 17*a* of each second fastening portion 17 may be continuous with the outermost surface of the block main body 11 without, for example, a step. Further, the upper surface 17*a* of the second fastening portion 17 may be continuous with the outermost surface of the corresponding collar 23 without, for example, a step. For example, between the upper surface 17*a* of the second fastening portion 17 and the outermost surface of the collar 23, the block main body 11 does not have to include a recess, such as a groove, and/or a projection, such as a wall. The block main body 11 does not have a recess or a projection that would interfere with flow of water on the upper surface 17*a* of the second fastening portion 17 (between outermost surface of collar 23 and the outermost surface of block main body 11). This block main body 11 is advantageous in that the water collected on the upper surface 17*a* of the second fastening portion 17 readily flows out toward the outermost surface of the block main body 11 due to, for example, the gravitational force. For example, even when the block main body 11 is level, the water on the upper surface 17*a* of the second fastening portion 17 may flow out toward the outermost surface of the block main body 11 due to the surface tension.

The block main body 11 may be referred to as a synthetic resin platform or an insulating resin platform. The ribs of the block main body 11 may each be referred to as a reinforcement rib. The reinforcement rib is arranged on the outer surface of the block main body 11 and is formed from synthetic resin. The reinforcement rib limits bending and deformation of the block main body 11 and/or the terminal block 10. A conventional example of a terminal block includes a non-resin reinforcement member. The non-resin reinforcement member may be a metal reinforcement plate that is at least partially embedded in the resin part of the block main body and extending radially outward from the block main body. The terminal block 10 of the above embodiment does not include such a reinforcement member, or a metal reinforcement plate. The ribs of the block main body 11 eliminate the need for such a non-resin reinforcement member, or a metal reinforcement plate at least partially embedded in the resin part of the block main body.

The present examples and embodiments are to be considered as illustrative and not restrictive. The scope of the present invention is defined not by the above detailed description, but by the claims and their equivalents, and all variations within the scope of the claims and their equivalents are to be construed as being included in the disclosure.

DESCRIPTION OF THE REFERENCE CHARACTERS

10 terminal block
11 block main body
12 terminal
12*a* one end
13 circumferential wall
14 first end
14*a* bottom wall
15 second end
15*a* bottom wall
16 first fastening portion
16*a* upper surface
16*b* lower surface
17 second fastening portion
17*a* upper surface
17*b* lower surface
18 main part
21 first through hole
22 second through hole
23 collar
31 first rib
32 rib
33 rib (third rib)
33*a* side surface
34 first portion
35 second portion
36 drain portion
36*a* boundary
37 sealing member
38 recess
38*a* edge
41 second rib
42 rib
43 rib (fourth rib)
43*a* side surface
44 first portion
45 second portion
46 receding surface
A coupling surface
C1 center axis
C2 center axis
D1 first direction
D2 second direction
D3 third direction
G gravitational direction L1 centerline
L2 reference line
S reference surface

The invention claimed is:

1. A terminal block, comprising:
a block main body; and
terminals held by the block main body, wherein:
the block main body includes
a through hole for accommodating a fastened bolt,
a first end that is one end in a second direction that is orthogonal to a first direction in which the through hole extends through the block main body, and
a second end that is an end located opposite to the first end in the second direction;
the terminal block is used in a state in which the block main body is tilted and the first end is lower than the second end;
the first end includes first ribs extending in the first direction;
the second end includes one or more second ribs extending in the first direction; and
a number of the first ribs is greater than a number of the second ribs.

2. The terminal block according to claim 1, wherein:
the through hole includes a first through hole extending through the first end in the first direction, and a second through hole extending through the second end in the first direction;
the first through hole includes two first through holes arranged next to each other in a direction that is orthogonal to the first direction and intersects the second direction;
the second through hole includes two second through holes arranged next to each other in a direction that is orthogonal to the first direction and intersects the second direction;
the first ribs are arranged between the two first through holes; and
the second ribs are arranged between the two second through holes.

3. The terminal block according to claim 2, wherein:
the first ribs include a rib that extends in the second direction as viewed in the first direction.

4. The terminal block according to claim 2, wherein:
the first ribs include a third rib that extends along an edge of one of the first through holes as viewed in the first direction;
the third rib is shaped such that the third rib extends around a side of the first through hole that is located toward the second end as viewed in the first direction;
in the block main body, a side of the first through hole located toward the third rib in the second direction is referred to as an inner side, and a side of the first through hole opposite to the inner side in the second direction is referred to as an outer side; and
the outer side of the first through hole in the second direction is free from a rib that opposes the third rib in the second direction.

5. The terminal block according to claim 2, wherein:
the second ribs include a fourth rib that extends along an edge of one of the second through holes as viewed in the first direction;
the fourth rib is shaped such that the fourth rib extends around a side of the second through hole that is located toward the first end as viewed in the first direction;
a straight line orthogonal to a center axis of the second through hole and parallel to the second direction is referred to as a reference line; and
the fourth rib includes a side surface located toward the second through hole, the side surface including a receding surface that extends away from the second through hole as the receding surface becomes farther away from the reference line.

6. The terminal block according to claim 1, wherein:
the terminals arranged next to each other in the second direction.

7. The terminal block according to claim 1, wherein:
the first end includes a bottom wall having an upper surface;
the first ribs extend from the upper surface of the bottom wall in the first direction; and
the bottom wall includes a drain portion shaped such that the upper surface becomes closer to a lower surface from a side of the second end toward a side of the first end.

8. The terminal block according to claim 7, wherein:
the upper surface of the drain portion is stepped such that the upper surface becomes closer to the lower surface from the side of the second end toward the side of the first end.

9. The terminal block according to claim 8, wherein:
the lower surface of the bottom wall includes a recess that receives a sealing member; and
the recess is arranged in the lower surface of the bottom wall so as not to extend across steps of the drain portion.

10. A terminal block, comprising:
a block main body; and
terminals held by the block main body, wherein:
the block main body includes
a through hole for accommodating a fastened bolt,
a first end that is one end in a second direction that is orthogonal to a first direction in which the through hole extends through the block main body, and
a second end that is an end located opposite to the first end in the second direction;
the terminal block is used in a state in which the block main body is tilted and the first end is lower than the second end;
the first end includes one or more first ribs extending in the first direction; and
the second end is free from a rib that extends in the first direction.

* * * * *